US005875534A

United States Patent [19]

Jackson

[11] Patent Number: 5,875,534

[45] Date of Patent: Mar. 2, 1999

[54] BROKEN DIPSTICK AND BUSHING REMOVER COMBINATION

[76] Inventor: Benjamin C. Jackson, 381 Boundary St., Falls City, Oreg. 97344

[21] Appl. No.: 10,748

[22] Filed: Jan. 22, 1998

[51] Int. Cl.$^{6}$ .................................................... B23P 19/04

[52] U.S. Cl. ............................................ 29/255; 29/263

[58] Field of Search ............................ 29/255, 256, 263, 29/280, 282, 244; 81/438, 439, 463, 27; 254/19, 20

[56] References Cited

U.S. PATENT DOCUMENTS

| | | | |
|---|---|---|---|
| 3,529,497 | 9/1970 | Brooks | 81/463 |
| 4,476,861 | 10/1984 | Dimalkos et al. | 29/255 |
| 5,090,102 | 2/1992 | Lovell | 29/255 |

*Primary Examiner*—David A. Scherbel
*Assistant Examiner*—Lee Wilson

[57] ABSTRACT

A broken dip stick tube or bushing remover is provided including a bolt having a cylindrical configuration with a top, a smooth intermediate extent, and a threaded bottom. A puller is provided having an upper portion with a cylindrical configuration and a threaded bore formed in a top face thereof for removably coupling with the threaded bottom of the bolt. The puller further has a bottom portion formed of a cylindrical rod with a diameter less than that of the upper portion and terminating in an enlarged head. The entire bottom portion has a plurality of longitudinal slots formed therein thereby forming multiple spaced resilient members which are adapted to be biased radially inward. A locking pin is situated between the spaced resilient members along an axis of the puller. Next provided is a slide hammer having a coaxial bore formed therein for allowing the intermediate extent of the bolt to be slidably situated therein.

4 Claims, 2 Drawing Sheets

BROKEN DIPSTICK AND BUSHING REMOVER COMBINATION

BACKGROUND OF THE INVENTION

1. Field of the Invention

The present invention relates to pulling devices and more particularly pertains to a new broken dipstick and bushing remover combination for removing an intermediate shaft bushing and a broken dipstick tube.

2. Description of the Prior Art

The use of pulling devices is known in the prior art. More specifically, pulling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art pulling devices include U.S. Pat. No. 4,003,119; U.S. Pat. No. 5,365,648; U.S. Pat. No. 5,058,255; U.S. Pat. No. 5,207,730; U.S. Pat. No. 5,165,157; and U.S. Patent Des. 262,513.

In these respects, the broken dipstick and bushing remover combination according to the present invention substantially departs from the conventional concepts and designs of the prior art, and in so doing provides an apparatus primarily developed for the purpose of removing an intermediate shaft bushing and a broken dipstick tube.

SUMMARY OF THE INVENTION

In view of the foregoing disadvantages inherent in the known types of pulling devices now present in the prior art, the present invention provides a new broken dipstick and bushing remover combination construction wherein the same can be utilized for removing an intermediate shaft bushing and a broken dipstick tube.

The general purpose of the present invention, which will be described subsequently in greater detail, is to provide a new broken dipstick and bushing remover combination apparatus and method which has many of the advantages of the pulling devices mentioned heretofore and many novel features that result in a new broken dipstick and bushing remover combination which is not anticipated, rendered obvious, suggested, or even implied by any of the prior art pulling devices, either alone or in any combination thereof.

To attain this, the present invention generally comprises a bolt having a cylindrical configuration. The bolt is equipped with a hexagon shaped top, a smooth intermediate extent, and a threaded bottom. Next provided is a puller having an upper portion with a cylindrical configuration. Formed in a top face of the upper portion is a threaded bore for removably coupling with the threaded bottom of the bolt. The puller further has an intermediate portion with a frusto-conical configuration, as shown in FIG. 3. A bottom portion of the puller is formed of a cylindrical rod with a diameter less than that of the upper portion. The bottom portion further terminates at a conical head. The entire bottom portion has a plurality of longitudinal slots formed therein thereby forming three spaced resilient members. Such resilient members are adapted to be biased radially inward. Also included is a locking pin situated between the spaced resilient members along an axis of the locking pin. The locking pin has an elongated generally cylindrical configuration with a cone shaped end and a flat end. It should be noted that the locking pin has a tapering periphery along its entire length. For inserting the puller within the desired conduit, a slide hammer is provided having a hexagonal cross-sectional along an entire length thereof. A coaxial bore is formed in the slide hammer for allowing the intermediate extent of the bolt to be slidably situated therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new broken dipstick and bushing remover combination apparatus and method which has many of the advantages of the pulling devices mentioned heretofore and many novel features that result in a new broken dipstick and bushing remover combination which is not anticipated, rendered obvious, suggested, or even implied by any of the prior art pulling devices, either alone or in any combination thereof.

It is another object of the present invention to provide a new broken dipstick and bushing remover combination which may be easily and efficiently manufactured and marketed.

It is a further object of the present invention to provide a new broken dipstick and bushing remover combination which is of a durable and reliable construction.

An even further object of the present invention is to provide a new broken dipstick and bushing remover combination which is susceptible of a low cost of manufacture with regard to both materials and labor, and which accordingly is then susceptible of low prices of sale to the consuming public, thereby making such broken dipstick and bushing remover combination economically available to the buying public.

Still yet another object of the present invention is to provide a new broken dipstick and bushing remover combination which provides in the apparatuses and methods of the prior art some of the advantages thereof, while simultaneously overcoming some of the disadvantages normally associated therewith.

Still another object of the present invention is to provide a new broken dipstick and bushing remover combination for removing an intermediate shaft bushing and a broken dipstick tube.

Even still another object of the present invention is to provide a new broken dipstick and bushing remover combination that includes a bolt having a cylindrical configuration with a top, a smooth intermediate extent, and a threaded bottom. A puller is provided having an upper portion with a cylindrical configuration and a threaded bore formed in a top face thereof for removably coupling with the threaded bottom of the bolt. The puller further has a bottom portion formed of a cylindrical rod with a diameter less than that of the upper portion and terminating in an enlarged head. The entire bottom portion has a plurality of longitudinal slots formed therein thereby forming multiple spaced resilient members which are adapted to be biased radially inward. A locking pin is situated between the spaced resilient members along an axis of the puller. Next provided is a slide hammer having a coaxial bore formed therein for allowing the intermediate extent of the bolt to be slidably situated therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
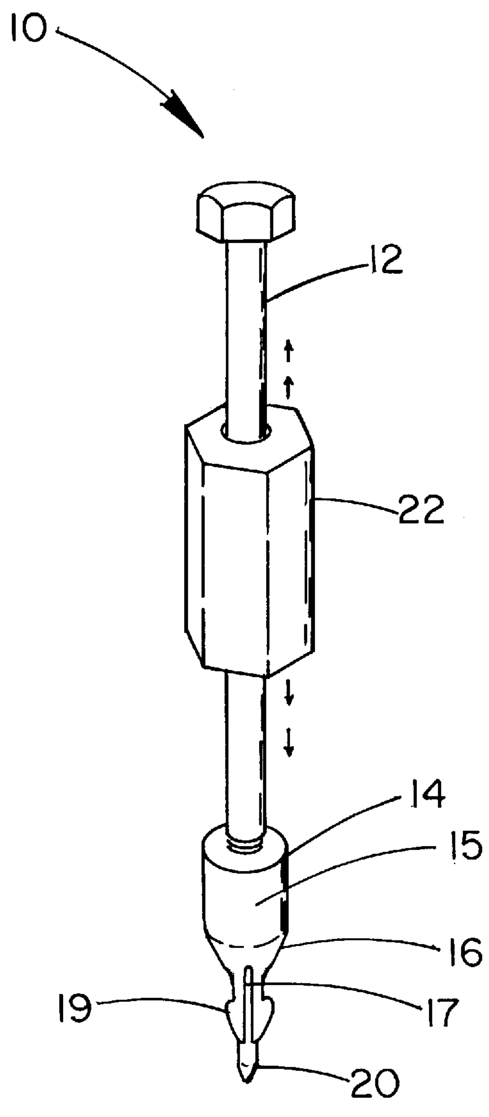
FIG. 1 is a perspective view of a new broken dipstick and bushing remover combination according to the present invention.
Figure 2:
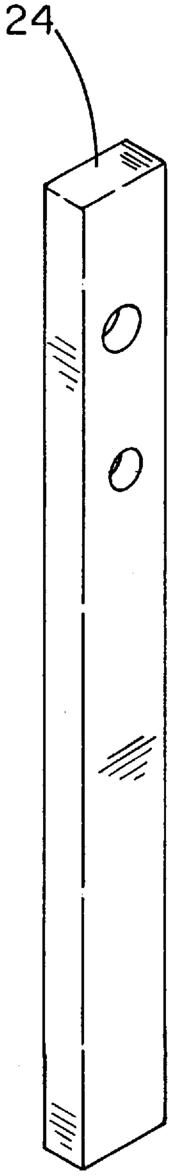
FIG. 2 is a perspective view of the bushing and broken tube remover of the present invention.
Figure 3:
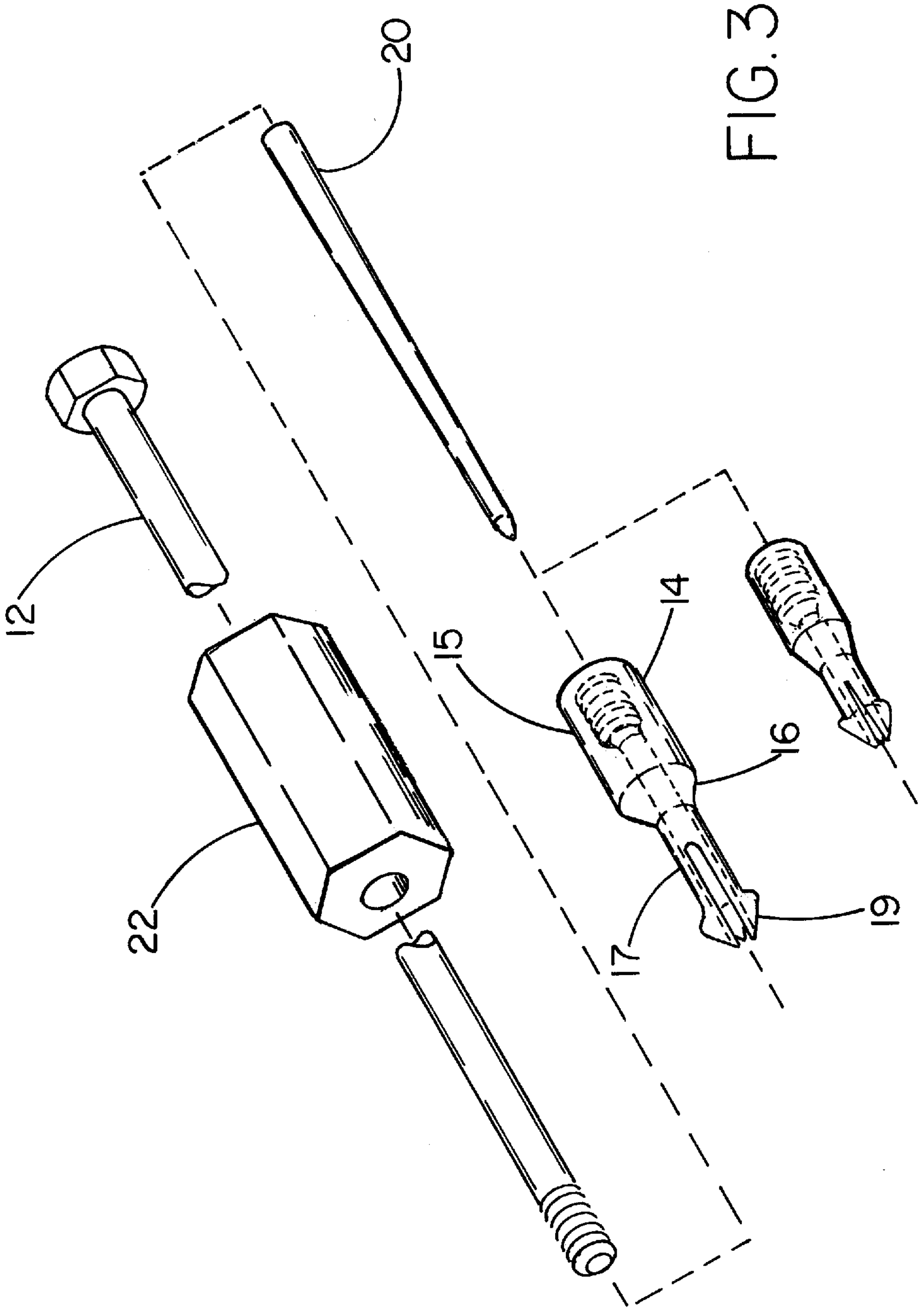
FIG. 3 is an exploded view of the present invention.

With reference now to the drawings, and in particular to FIGS. 1 through 3 thereof, a new broken dipstick and bushing remover combination embodying the principles and concepts of the present invention and generally designated by the reference numeral 10 will be described.

The present invention, designated as numeral 10, includes a bolt 12 having a cylindrical configuration. The bolt is equipped with a hexagon shaped top, a smooth intermediate extent, and a threaded bottom. Preferably, the threaded bottom has a length that is less than 1/10 that of the smooth intermediate extent.

Next provided is a puller 14 having an upper portion 15 with a cylindrical configuration. Formed in a top face of the upper portion is a threaded bore for removably coupling with the threaded bottom of the bolt. The puller further has an intermediate portion 16 with a frusto-conical configuration, as shown in FIG. 3.

A bottom portion 19 of the puller is formed of a cylindrical rod with a diameter less than that of the upper portion. The bottom portion further terminates at a conical head. In the preferred embodiment, the bottom portion has a length which constitutes half that of the puller which in turn has a length which is at least ¼ that of the bolt. The entire bottom portion has a plurality of longitudinal slots 17 formed therein thereby forming three spaced resilient members. These spaced resilient members thus have a pieshaped cross-section. The resilient members arc adapted to be biased radially inward. It should be noted that the puller may formed of one of two varying diameters, one for the removal of a bushing and one for the removal of a dip stick tube.

Also included is a locking pin 20 situated between the spaced resilient members along an axis of the locking pin. The locking pin has an elongated generally cylindrical configuration with a cone shaped end and a flat end. It should be noted that the locking pin has a tapering periphery along its entire length which is no longer than the puller.

For inserting the puller within the desired conduit, a slide hammer 22 is provided having a hexagonal cross-sectional along an entire length thereof. A coaxial bore is formed in the slide hammer for allowing the intermediate extent of the bolt to be slidably situated therein. Ideally, the slide hammer has a length approximately ⅓ that of the bolt. Once inserted, the resilient members of the puller may be biased radially outward by way of the rotation of the bolt.

Finally, a bushing remover 24 is provided having a rectangular configuration with an a pair of side faces and a thin periphery formed therebetween. Formed through an end of the side faces is a pair spaced differently sized circular bores. Such bores preferably include a ¼ inch hole and a 7/16 inch hole. The bushing remover is used for removing broken tubes and bushings from the pullers after the parts are removed from an engine block.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A broken dip stick tube or bushing remover comprising, in combination:

a bolt having a cylindrical configuration with a hexagon shaped top, a smooth intermediate extent, and a threaded bottom, wherein the threaded bottom has a length that is less than 1/10 that of the smooth intermediate extent;

a pair of pullers having unique diameters and each having an upper portion with a cylindrical configuration and a threaded bore formed in a top face thereof for removably coupling with the threaded bottom of the bolt, the puller further having an intermediate portion with a frusto-conical configuration and a bottom portion formed of a cylindrical rod with a diameter less than that of the upper portion and terminating in a conical head that tapers inwardly from an inboard extent to an outboard extent thereof, the entire bottom portion having a plurality of longitudinal slots formed therein thereby forming three spaced resilient members which are adapted to be biased radially, wherein the bottom portion has a length which constitutes half that of the puller which in turn has a length which is at least ¼ that of the bolt;

a locking pin situated between the spaced resilient members of one of the pullers along an axis of the locking pin and having an elongated generally cylindrical configuration with a cone shaped end and a flat end, the locking pin having a tapering periphery along a length thereof which is longer than that of each puller, wherein the resilient members of the puller may be biased radially outward by way of the rotation of the bolt; and a slide hammer having a hexagonal cross-sectional along an entire length thereof with a coaxial bore formed therein for allowing the intermediate extent of the bolt to be slidably situated therein, wherein the slide hammer has a length which is approximately ⅓ that of the bolt.

2. A broken dip stick tube or bushing remover comprising, in combination:

a bolt having a cylindrical configuration with a top, a smooth intermediate extent, and a threaded bottom;

a puller having an upper portion with a cylindrical configuration and a threaded bore formed in a top face thereof for removably coupling with the threaded bottom of the bolt, the puller further having a bottom portion formed of a cylindrical rod with a diameter less than that of the upper portion and terminating in an enlarged conical head which tapers from an inboard extent to an outboard extent thereof, the entire bottom portion having a plurality of longitudinal slots formed therein thereby forming multiple spaced resilient members which are adapted to be biased radially inward;

a locking pin situated between the spaced resilient members along an axis of the puller and having an elongated generally cylindrical configuration with a cone shaped end and a flat end, the locking pin having a tapering periphery along a length thereof; and a slide hammer having a coaxial bore formed therein for allowing the intermediate extent of the bolt to be slidably situated therein.

3. A broken dip stick tube or bushing remover as set forth in claim 2 wherein the slide hammer has a hexagonal cross-scctional along an entire length thereof.

4. A broken dip stick tube or bushing remover as set forth in claim 2 wherein the puller is removable and a pair of differently sized pullers are included.

* * * * *